(12) United States Patent
Obika et al.

(10) Patent No.: US 9,203,073 B2
(45) Date of Patent: Dec. 1, 2015

(54) BIPOLAR BATTERY

(75) Inventors: Motoharu Obika, Yokohama (JP);
Hideaki Horie, Yokosuka (JP); Yoshiaki Nitta, Yokohama (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 255 days.

(21) Appl. No.: 13/812,053

(22) PCT Filed: Jul. 19, 2011

(86) PCT No.: PCT/JP2011/066386
§ 371 (c)(1),
(2), (4) Date: Jan. 24, 2013

(87) PCT Pub. No.: WO2012/014730
PCT Pub. Date: Feb. 2, 2012

(65) Prior Publication Data
US 2013/0122333 A1    May 16, 2013

(30) Foreign Application Priority Data
Jul. 26, 2010   (JP) ................. 2010-166858

(51) Int. Cl.
*H01M 2/00* (2006.01)
*H01M 2/34* (2006.01)
(Continued)

(52) U.S. Cl.
CPC .............. *H01M 2/345* (2013.01); *H01M 2/021* (2013.01); *H01M 2/0212* (2013.01); *H01M 2/0217* (2013.01); *H01M 2/0275* (2013.01); *H01M 2/1229* (2013.01); *H01M 2/26* (2013.01);
(Continued)

(58) Field of Classification Search
None
See application file for complete search history.

(56) References Cited

U.S. PATENT DOCUMENTS 4,091,186 A   5/1978   Ott et al.
5,800,939 A   9/1998   Mishina et al.
(Continued)

FOREIGN PATENT DOCUMENTS

CN   101312245 A   11/2008
DE   103 52 046 A1   6/2005
(Continued)

OTHER PUBLICATIONS

Naoto et al., Bipolar Secondary Battery, Battery Pack Using the Same, and Vehicle, JP 2010-251017, abstract English translation and figures 9-21, Nov. 4, 2010.*
(Continued)

*Primary Examiner* — Patrick Ryan
*Assistant Examiner* — Jose Colucci Rios
(74) *Attorney, Agent, or Firm* — Foley & Lardner LLP

(57) ABSTRACT

A bipolar battery includes: a power generation element formed by stacking a plurality of bipolar electrodes, in which an electrode layer is formed on a front and a rear of a collector, via an electrolyte layer; an elastic metal portion provided in contact with the power generation element so as to contact the power generation element in point or line contact when no external force is exerted thereon and contact the power generation element in surface contact when external force is exerted thereon; and an outer covering material provided to accommodate the power generation element and the elastic metal portion, an internal air pressure of which is set to be lower than an atmospheric pressure such that the elastic metal portion is caused to contact the power generation element in surface contact by a pressure difference between the internal air pressure and the atmospheric pressure.

8 Claims, 9 Drawing Sheets

(51) Int. Cl.

| | | |
|---|---|---|
| *H01M 2/26* | (2006.01) | |
| *H01M 2/30* | (2006.01) | |
| *H01M 10/04* | (2006.01) | |
| *H01M 2/02* | (2006.01) | |
| *H01M 2/12* | (2006.01) | |
| *H01M 10/0525* | (2010.01) | |

(52) U.S. Cl.
CPC .............. *H01M2/30* (2013.01); *H01M 2/348* (2013.01); *H01M 10/044* (2013.01); *H01M 10/0525* (2013.01); *H01M 2200/20* (2013.01)

(56) References Cited

U.S. PATENT DOCUMENTS

| | | | |
|---|---|---|---|
| 5,916,709 | A | 6/1999 | Arias et al. |
| 6,632,538 | B1 | 10/2003 | Yamazaki et al. |
| 7,635,535 | B2 | 12/2009 | Ebi et al. |
| 2001/0038938 | A1 | 11/2001 | Takahashi et al. |
| 2004/0029001 | A1 | 2/2004 | Yamazaki et al. |
| 2004/0096735 | A1* | 5/2004 | Komatsu et al. ............. 429/176 |
| 2006/0134528 | A1 | 6/2006 | Ihara et al. |
| 2006/0292443 | A1* | 12/2006 | Ogg et al. ................... 429/185 |
| 2007/0096688 | A1* | 5/2007 | Suzuki et al. ................ 320/112 |
| 2008/0292963 | A1 | 11/2008 | Sato et al. |
| 2009/0023059 | A1* | 1/2009 | Kinoshita et al. ............ 429/153 |
| 2011/0183166 | A1* | 7/2011 | Suga et al. .................... 429/61 |
| 2013/0059179 | A1 | 3/2013 | Hosaka et al. |

FOREIGN PATENT DOCUMENTS

| | | |
|---|---|---|
| EP | 1 986 255 A2 | 10/2008 |
| JP | 8-64234 A | 3/1996 |
| JP | 2001-135357 A | 5/2001 |
| JP | 2002-8629 A | 1/2002 |
| JP | 2003-208885 A | 7/2003 |
| JP | 2004-3 27047 A | 11/2004 |
| JP | 2004-319156 A | 11/2004 |
| JP | 2006-73260 A | 3/2006 |
| JP | 2006-147534 A | 6/2006 |
| JP | 2007-122977 A | 5/2007 |
| JP | 2008-140633 | 6/2008 |
| JP | 2010-251017 A | 11/2010 |
| KR | 10-2007-0107922 A | 11/2007 |
| RU | 2 273 917 C2 | 4/2006 |
| RU | 2 324 261 C2 | 5/2008 |
| RU | 2 335 039 C1 | 9/2008 |
| TW | I291776 B | 12/2007 |
| TW | I291776 B | 12/2007 |
| WO | WO 03/043106 A1 | 5/2003 |
| WO | WO 2006/068384 A1 | 6/2006 |
| WO | WO 2011/145608 A1 | 11/2011 |

OTHER PUBLICATIONS

Russian Decision on Grant and English language translation dated Mar. 19, 2014 (13 pgs.).
Taiwanese Office Action dated Oct. 9, 2013 (5 pages).
Chinese Office Action dated Jul. 21, 2014, 5 pgs.
Japanese Office Action dated Dec. 10, 2013, (2 pgs.).

\* cited by examiner

BIPOLAR BATTERY

TECHNICAL FIELD

This invention relates to a bipolar battery.

BACKGROUND ART

JP-2004-319156-A discloses a bipolar battery formed by stacking a plurality of bipolar electrodes, in which electrode layers are formed on front and rear surfaces of a collector, via an electrolyte layer.

SUMMARY OF INVENTION

In this type of bipolar battery, however, a temperature of a power generation element may rise excessively when a cause of an abnormality, such as an external short circuit, arises. When the power generation element increases in temperature, an electrolyte (an electrolyte solution) may gasify, leading to an increase in an internal pressure of an outer covering material.

This invention focuses on this conventional problem, and an object of this invention is to provide a bipolar battery in which an excessive current is prevented from flowing by limiting a current amount when gas is generated such that an internal pressure of an outer covering material increases.

According to an aspect of this invention, a bipolar battery includes a power generation element formed by stacking a plurality of bipolar electrodes, in which an electrode layer is formed on a front and a rear of a collector, via an electrolyte layer. The bipolar battery also includes: an elastic metal portion provided in contact with the power generation element so as to contact the power generation element in point or line contact when no external force is exerted thereon and contact the power generation element in surface contact when external force is exerted thereon; and an outer covering material provided to accommodate the power generation element and the elastic metal portion, an internal air pressure of which is set to be lower than an atmospheric pressure such that the elastic metal portion is caused to contact the power generation element in surface contact by a pressure difference between the internal air pressure and the atmospheric pressure.

Embodiments and advantages of this invention will be described in detail below together with the attached figures.

DESCRIPTION OF EMBODIMENTS

First Embodiment

Figure 1A:
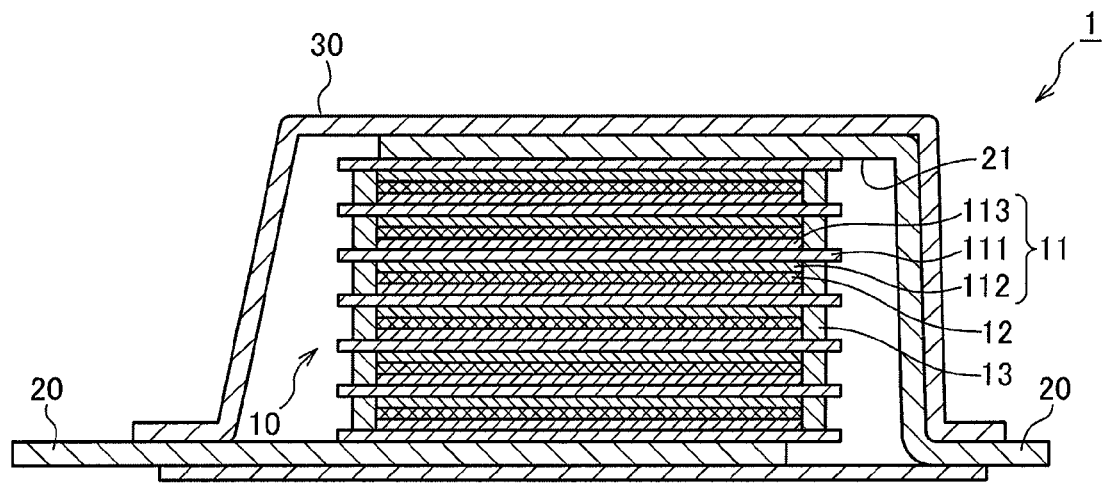
FIGS. 1A-1C are views showing a first embodiment of a bipolar battery according to this invention.
Figure 1B:
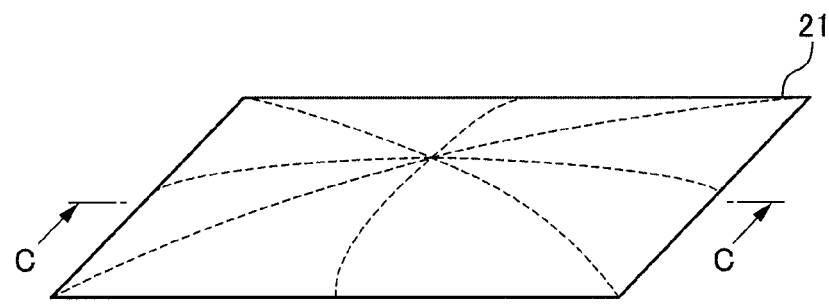
Figure 1C:

FIGS. 1A-1C are views showing a first embodiment of a bipolar battery according to this invention, wherein FIG. 1A is a longitudinal sectional view showing an assembled condition, FIG. 1B is a perspective view of an elastic metal portion of an electrode tab in a condition where no external force is exerted thereon, and FIG. 1C is a C-C sectional view of FIG. 1B.

A bipolar battery 1 includes a power generation element 10, an electrode tab 20, and an outer covering material 30.

The power generation element 10 includes a bipolar electrode 11, an electrolyte layer 12, and a seal 13.

The bipolar electrode 11 includes a collector 111, a positive electrode 112, and a negative electrode 113. The positive electrode 112 is formed on one surface (a lower surface in FIG. 1A) of the collector 111. The negative electrode 113 is formed on an opposite surface (an upper surface in FIG. 1A) of the collector 111.

The collector 111 is formed from a conductive material such as a metal, a conductive polymer material, or a nonconductive polymer material containing an added conductive filler, for example. Examples of metals that can be used favorably as the material of the collector 111 include aluminum, nickel, iron, stainless steel, titanium, and copper. Further, a cladding material of nickel and aluminum, a cladding material of copper and aluminum, a plating material formed from a combination of these metals, and so on may be used. Alternatively, a foil formed by covering a metallic surface with aluminum may be used. In consideration of electron conductivity and a battery operation potential, aluminum, stainless steel, and copper are particularly preferable.

Further, examples of conductive polymer materials that can be used favorably as the material of the collector 111 include polyaniline, polypyrrole, polythiophene, polyacetylene, poly-paraphenylene, poly-phenylenevinylene, polyacrylonitrile, and polyoxadiazole. These conductive polymer materials have sufficient conductivity without the need to add a conductive filler, and are therefore advantageous in terms of simplifying a manufacturing process and reducing a weight of the collector 111. It should be noted, however, that a conductive filler may be added if necessary.

Furthermore, examples of nonconductive polymer materials containing an added conductive filler that can be used favorably as the material of the collector 111 include polyethylene (PE; high density polyethylene (HDPE) or low density polyethylene (LDPE)), polypropylene (PP), polyethylene terephthalate (PET), polyether nitrile (PEN), polyimide (PI), polyamide-imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene difluoride (PVdF), and polystyrene (PS). With these nonconductive polymer materials, superior potential resistance and solvent resistance can be obtained.

There are no particular limitations on the conductive filler as long as it is a conductive substance. However, a metal or the like, conductive carbon, and so on exhibit superior conductivity and potential resistance and a superior lithium ion blocking property. Examples of metals or the like that can be used favorably as the material of the conductive filler include at least one metal selected from a group including Ni, Ti, Al, Cu, Pt, Fe, Cr, Sn, Zn, In, Sb, and K, an alloy containing these metals, and a metal oxide containing these metals. A favorable type of conductive carbon used as the material of the conductive filler preferably includes at least one type selected from a group including acetylene black, vulcan, black pearl, carbon nanofiber, ketjen black, carbon nanotubes, carbon nanohorns, carbon nanoballoons, and fullerene. There are no particular limitations on an amount of added conductive filler as long as the collector 111 can be provided with sufficient conductivity, but typically an amount between approximately 5% and 35% by weight is added.

A size of the collector 111 is determined according to a use application of the battery. For example, a collector 111 having a large surface area is used for a large battery requiring high energy density. There are no particular limitations on a thickness of the collector 111. The thickness of the collector 111 is typically set between approximately 1 and 100 μm.

As described above, the positive electrode 112 is formed on one surface (the lower surface in FIG. 1A) of the collector 111. The positive electrode 112 is a layer including a positive electrode active material. The positive electrode active material is a composition that occludes ions during discharging and discharges ions during charging. A preferable example of the positive electrode active material is a lithium-transition metal compound oxide, which is a compound oxide of a transition metal and lithium. More specifically, a lithium-transition metal compound oxide is formed by partially replacing an Li/Co-based compound oxide such as $LiCoO_2$, an Li/Ni-based compound oxide such as $LiNiO_2$, an Li/Mn-based compound oxide such as spinel $LiMn_2O_4$, or an Li/Fe-based compound oxide such as $LiFeO_2$ and a transition metal thereof with another element or the like. A lithium-transition metal compound oxide exhibits superior responsiveness and a superior cycle characteristic, and a manufacturing cost thereof is low. Alternatively: a phosphate compound or a sulfate compound of a transition metal and lithium, such as $LiFePO_4$; a transition metal oxide or sulfide such as $V_2O_5$, $MnO_2$, $TiS_2$, $MoS_2$, or $MoO_3$; $PbO_2$; $AgO$; $NiOOH$; and so on may be used. The positive electrode active material may be used singly or in a mixture of two or more types. There are no particular limitations on an average particle size of the positive electrode active material, but in terms of increasing a capacity and improving the responsiveness and cycle characteristic of the positive electrode active material, the average particle size is preferably between 1 and 100 μm, and more preferably between 1 and 20 μm. Within this range, an increase in an internal resistance of a secondary battery during charging and discharging under high output conditions can be suppressed, and a sufficient current can be extracted. It should be noted that when the positive electrode active material is formed from secondary particles, an average particle size of primary particles constituting the secondary particles is preferably set within a range of 10 nm to 1 μm, but is not necessarily limited to this range. Depending on a manufacturing method, however, it may not be necessary to form the positive electrode active material from secondary particles through coagulation, aggregation, and so on. The positive electrode active material may take different shapes, for example a spherical shape (a powder form), a plate shape, a needle shape, a columnar shape, an angular shape, and so on, depending on the type, the manufacturing method, and so on. However, the positive electrode active material is not limited to these shapes, and any shape can be used without problems. An optimum shape with which battery characteristics such as a charging/discharging characteristic can be improved is preferably selected appropriately.

The active material layer may include other substances as required. For example, an electrolyte, a lithium salt, a conduction aid, and so on may be included to achieve an increase in ion conductivity.

The electrolyte may be a solid polymer electrolyte, a polymer gel electrolyte, an electrolyte formed by stacking a solid polymer electrolyte and a polymer gel electrolyte, and so on. In other words, the positive electrode may be formed with a multilayer structure such that the types of electrolyte and the types and particle sizes of the active materials constituting the positive electrode, as well as the blending ratios thereof, differ between layers formed on the collector side and the electrolyte side. A ratio (a mass ratio) between a polymer and an electrolyte solution constituting the polymer gel electrolyte is preferably set between 20:80 and 98:2, i.e. within a range where a proportion of the electrolyte solution is comparatively small.

In a polymer gel electrolyte, an electrolyte solution used in a typical lithium ion battery is contained in a solid polymer electrolyte possessing ion conductivity. An electrolyte in which a similar electrolyte solution is supported by a polymer backbone not possessing lithium ion conductivity may also be used.

Here, the electrolyte solution (electrolyte salt and a plasticizer) contained in the polymer gel electrolyte may be any electrolyte solution used in a typical lithium ion battery. For example, an electrolyte solution that contains at least one type of lithium salt (electrolyte salt) selected from inorganic acid anion salts such as $LiPF_6$, $LiBF_4$, $LiClO_4$, $LiAsF_6$, $LiTaF_6$, $LiAlCl_4$, and $Li_2B_{10}Cl_{10}$ and organic acid anion salts such as $LiCF_3SO_3$, $Li(CF_3SO_2)_2N$, and $Li(C_2F_5SO_2)_2N$, and uses an organic solvent (a plasticizer) such as an aprotic solvent intermixed with at least one substance selected from: a cyclic carbonate such as propylene carbonate or ethylene carbonate; a chain carbonate such as dimethyl carbonate, methylethyl carbonate, and diethyl carbonate; an ether such as tetrahydrofuran, 2-methyltetrahydrofuran, 1,4-dioxane, 1,2-dimethoxyethane, and 1,2-dibutoxyethane; a lactone such as γ-butyrolactone; a nitrile such as acetonitrile; an ester such as methyl propionate; an amide such as dimethylformamide; methyl acetate; and methyl formate, or the like may be used. It should be noted, however, that the electrolyte solution is not limited thereto.

The polymer not possessing lithium ion conductivity used in the polymer gel electrolyte may be, for example, polyvinylidene difluoride (PVDF), polyvinyl chloride (PVC), polyacrylonitrile (PAN), or polymethyl methacrylate (PMMA). It should be noted, however, that the polymer is not limited thereto. PAN and PMMA are not completely devoid of lithium ion conductivity, and therefore a polymer possessing ion conductivity may be used. In this example, however, a polymer not possessing lithium ion conductivity is used in the polymer gel electrolyte.

The lithium salt is, for example, an inorganic acid anion salt such as $LiPF_6$, $LiBF_4$, $LiClO_4$, $LiAsF_6$, $LiTaF_6$, $LiAlCl_4$, and $Li_2B_{10}Cl_{10}$, an organic acid anion salt such as $Li(CF_3SO_2)_2N$ or $Li(C_2F_5SO_2)_2N$, a mixture thereof, and so on. However, the lithium salt is not limited thereto.

The conduction aid is an additive blended in order to improve the conductivity of the active material layer. Acetylene black, carbon black, and graphite, for example, may be used as the conduction aid. However, the conduction aid is not limited thereto.

Blending amounts of the positive electrode active material, the electrolyte (preferably a solid polymer electrolyte), the lithium salt, and the conduction aid in the positive electrode are to be determined in consideration of an intended use (whether emphasis is to be placed on output, energy, or another consideration) and the ion conductivity of the battery. For example, when the blending amount of the electrolyte, in particular a solid polymer electrolyte, in the positive electrode is too small, ion conduction resistance and ion diffusion resistance in the active material layer increase, leading to deterioration of a battery performance. When the blending amount of the electrolyte, in particular a solid polymer electrolyte, in the positive electrode is too large, on the other hand, an energy density of the battery decreases. Hence, an amount of solid polymer electrolyte that is suitable for purpose is determined in consideration of these factors.

There are no particular limitations on a thickness of the positive electrode, and as described above in relation to the blending amounts, the thickness is preferably determined in consideration of the intended use (whether emphasis is to be placed on output, energy, or another consideration) and the ion conductivity of the battery. The thickness of a typical positive electrode active material layer is between approximately 10 and 500 µm.

As described above, the negative electrode 113 is formed on one surface (the upper surface in FIG. 1A) of the collector 111. The negative electrode 113 is a layer including a negative electrode active material layer. The negative electrode active material is a composition capable of discharging ions during discharging and occluding ions during charging. There are no particular limitations on the negative electrode active material as long as it is capable of occluding and discharging lithium reversibly. However, preferable examples of the negative electrode active material include a metal such as Si or Sn, a metal oxide such as TiO, $Ti_2O_3$, $TiO_2$, $SiO_2$, SiO, or $SnO_2$, a compound oxide of lithium and a transition metal such as $Li_{4/3}Ti_{5/3}O_4$ or $Li_7MnN$, an Li—Pb alloy, an Li—Al alloy, Li, a carbon material such as natural graphite, artificial graphite, carbon black, activated carbon, carbon fiber, coke, soft carbon, or hard carbon, and so on. Further, the negative electrode active material preferably contains an element that is alloyed to lithium. When an element alloyed to lithium is used instead of a conventional carbon-based material, a battery exhibiting a high energy density, a large capacity, and a superior output characteristic can be obtained. A single material or a mixture of two or more materials may be used as the negative electrode active material.

Examples of elements alloyed to lithium include Si, Ge, Sn, Pb, Al, In, Zn, H, Ca, Sr, Ba, Ru, Rh, Ir, Pd, Pt, Ag, Au, Cd, Hg, Ga, Tl, C, N, Sb, Bi, O, S, Se, Te, and Cl. Of these elements, a carbon material and/or at least one element selected from a group including Si, Ge, S Pb, Al, In, and Zn is preferable in order to be able to construct a battery having a large capacity and a superior energy density. A carbon material, Si, and Sn are particularly preferable. These elements may be used singly or in combinations of two or more.

There are no particular limitations on the particle size and shape of the negative electrode active material, and the negative electrode active material may take a similar form to the positive electrode active material described above. Accordingly, detailed description thereof has been omitted. Further, similarly to the positive electrode active material, another substance, for example an electrolyte, a lithium salt, a conduction aid, and so on for improving the ion conductivity, may be included if necessary.

The electrolyte layer 12 is a polymer gel electrolyte layer, for example. The electrolyte may be formed with a multilayer structure such that the types of electrolyte and component blending ratios differ between layers formed on the positive electrode side and the negative electrode side. When a polymer gel electrolyte is used, the ratio (mass ratio) between the polymer and the electrolyte solution constituting the polymer gel electrolyte is preferably set between 20:80 and 2:98, i.e. within a range where the proportion of the electrolyte solution is comparatively large.

In this type of polymer gel electrolyte, an electrolyte solution used in a typical lithium ion battery is contained in a solid polymer electrolyte possessing ion conductivity. An electrolyte in which a similar electrolyte solution is supported by a polymer backbone not possessing lithium ion conductivity may also be used. This is similar to the polymer gel electrolyte described as one type of the electrolyte contained in the positive electrode, and therefore description thereof has been omitted.

The solid polymer electrolyte or the polymer gel electrolyte may be included in the positive electrode and/or the negative electrode, as described above, as well as serving as the polymer electrolyte forming the battery. However, different or identical polymer electrolytes may be used as the polymer electrolyte forming the battery and in the positive electrode and the negative electrode, and different polymer electrolytes may be used on different layers.

There are no particular limitations on the thickness of the electrolyte forming the battery. However, the electrolyte is preferably as thin as possible within a range where the electrolyte can function in order to obtain a compact bipolar battery. The thickness of a typical solid polymer electrolyte layer is set between approximately 10 and 100 µm. However, the electrolyte can easily be formed in a shape that covers an upper surface and a side face outer peripheral portion of the electrode (the positive electrode or the negative electrode) by taking advantage of manufacturing method characteristics, and therefore required functions and performance can be realized without forming the electrolyte at a substantially constant thickness in all sites.

The seal 13 is disposed between upper and lower collectors 111 around the positive electrode 112, the negative electrode 113, and the electrolyte layer 12. The seal 13 prevents contact between the collectors and short circuiting in end portions of a single cell layer. A material of the seal 13 is selected in consideration of an insulating property, a sealing property for preventing the solid electrolyte from falling, a sealing property (water tightness) for preventing moisture penetration from the outside, heat resistance at a battery operating temperature, and so on. For example, acryl resin, urethane resin, epoxy resin, polyethylene resin, polypropylene resin, polyimide resin, rubber, nylon resin, and so on may be used favorably. Of these materials, polyethylene resin, polypropylene resin, and acryl resin are particularly preferable in consideration of corrosion resistance, chemical resistance, ease of manufacture (a film forming property), and economic performance.

The electrode tab 20 includes an elastic metal portion 21 that contacts the power generation element 10. One end of the electrode tab 20 is exposed to the exterior of the outer covering material 30. The electrode tab 20 is formed from aluminum, copper, titanium, nickel, stainless steel (SUS), an alloy thereof, or the like, for example. In consideration of corrosion resistance, ease of manufacture, economic performance, and so on, aluminum is particularly preferable. The electrode tab 20 of the positive electrode and the electrode tab 20 of the negative electrode may be formed from identical or different materials. Further, the electrode tab 20 may be formed by stacking different materials into a large number of layers.

As shown in FIGS. 1B and 1C, the elastic metal portion 21 of the electrode tab 20 is formed such that when no external force is exerted thereon, the vicinity of a center thereof separates from the power generation element 10 so as to project (upward in FIGS. 1B and 1C).

Further, in the assembled condition shown in FIG. 1A, the outer covering material is sealed such that an internal air pressure thereof is lower than atmospheric pressure, for example substantially in a vacuum condition. In this condition, atmospheric pressure acts on the elastic metal portion 21 such that an entire surface of the elastic metal portion 21 comes into contact (surface contact) with the power generation element 10.

The elastic metal portion 21 is an elastic member that can be deformed by applying external force thereto.

The outer covering material 30 houses the power generation element 10. The outer covering material 30 is flexible. Various materials may be used for the outer covering material 30, for example a sheet material made of a polymer-metal compound laminate film that is formed by covering a metal (including an alloy) such as aluminum, stainless steel, nickel, or copper with a polypropylene film. A periphery of the outer covering material 30 is heat-sealed after the power generation element 10 has been housed therein. In the assembled condition shown in FIG. 1A, the interior of the outer covering material 30 is set substantially in a vacuum, i.e. at a lower pressure than atmospheric pressure.

Figure 2A:
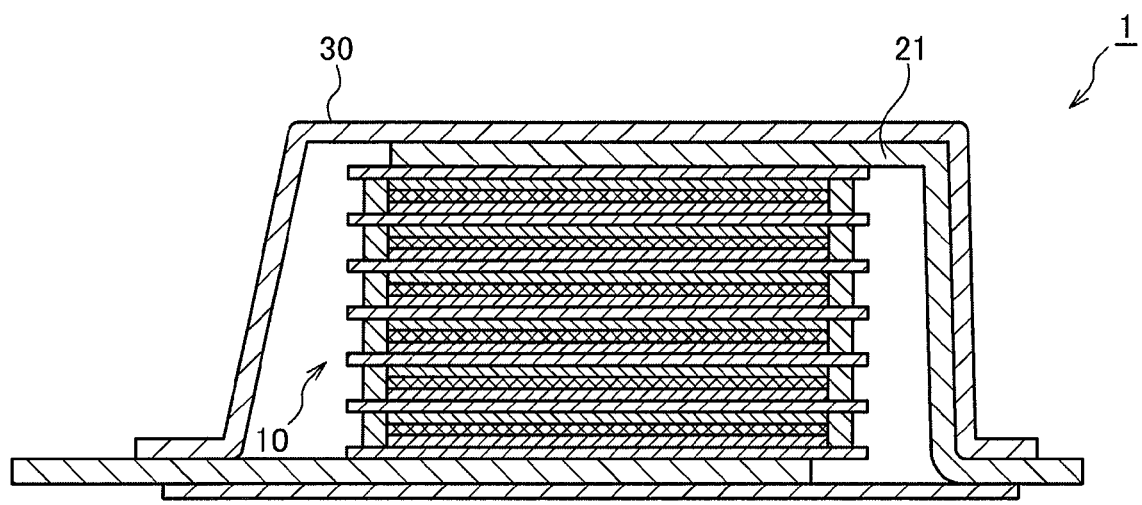
FIGS. 2A and 2B are views illustrating actions and effects of the first embodiment.
Figure 2B:
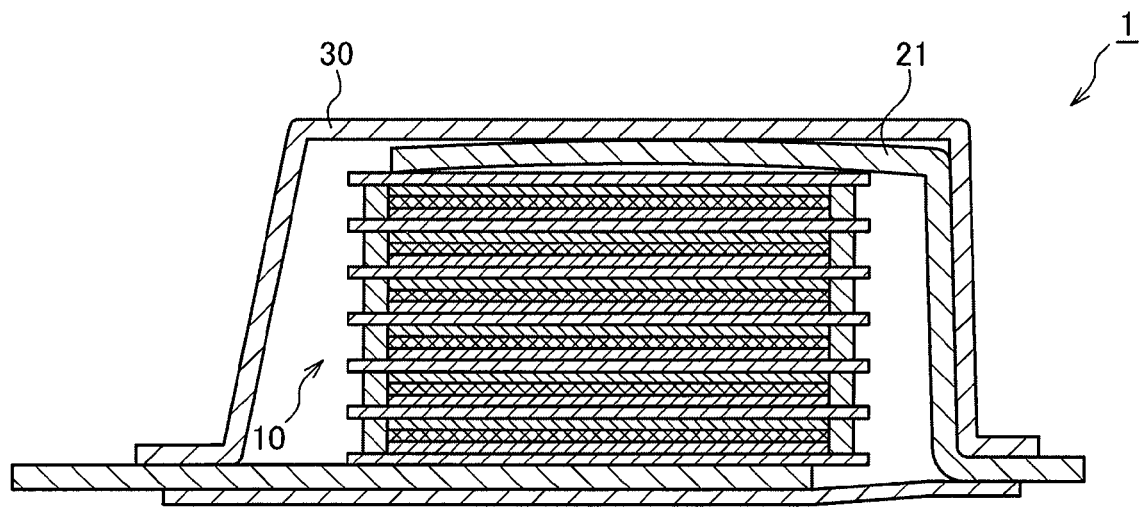

FIGS. 2A and 2B are views illustrating actions and effects of this embodiment, wherein FIG. 2A shows a normal condition and FIG. 2B shows an abnormal condition.

In a condition where the entire surface of the elastic metal portion 21 is in contact (surface contact) with the power generation element 10, a current flows uniformly over all surfaces. However, when such as an external short circuit occurs, a temperature of the power generation element 10 may increase. When the temperature of the power generation element 10 increases, the electrolyte (electrolyte solution) gasifies, leading to an increase in the internal pressure of the outer covering material. In such a case, as shown in FIG. 2B, the elastic metal portion 21 deforms such that the vicinity of the center thereof projects, with the result that the elastic metal portion 21 separates from the power generation element 10. Accordingly, the current can only flow near the periphery, and therefore a current amount is limited. As a result, an excessive current is prevented from flowing.

The periphery of the outer covering material 30 is heat-sealed, but by partially reducing a heat sealing width, a flexible valve can be formed in a corresponding location. Hence, when the electrolyte (electrolyte solution) gasifies, leading to an increase in the internal air pressure of the outer covering material, the internal air pressure escapes through the flexible valve such that the internal air pressure of the outer covering material is held at atmospheric pressure. As a result, the internal air pressure of the outer covering material can be prevented from increasing excessively.

Second Embodiment

Figure 3A:
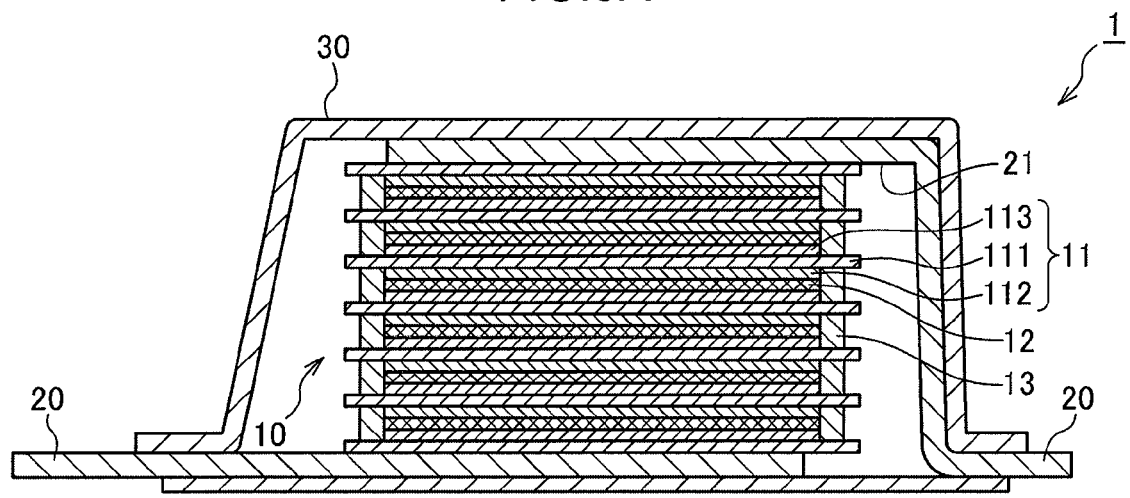
FIGS. 3A-3C are views showing a second embodiment of the bipolar battery according to this invention.
Figure 3B:
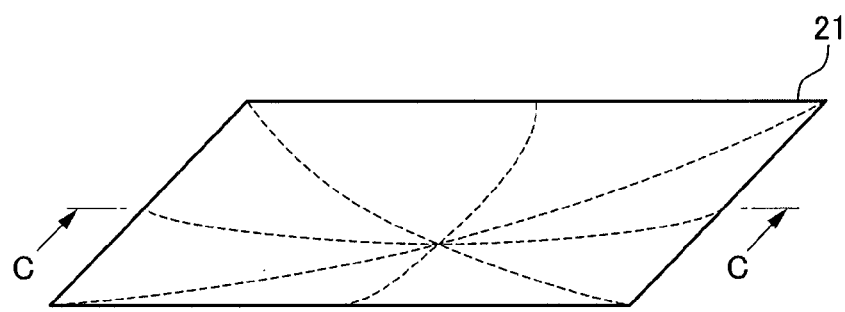
Figure 3C:
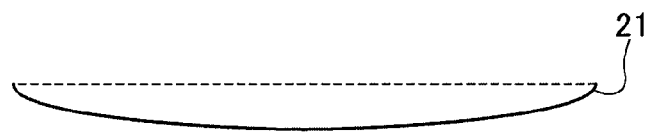

FIGS. 3A-3C are views showing a second embodiment of the bipolar battery according to this invention, wherein FIG. 3A is a longitudinal sectional view showing an assembled condition, FIG. 3B is a perspective view of the elastic metal portion of the electrode tab in a condition where external force is not exerted thereon, and FIG. 3C is a C-C sectional view of FIG. 3B.

It should be noted that in the following description, parts that exhibit similar functions to those described above have been allocated identical reference numerals, and where appropriate, duplicate description thereof has been omitted.

As shown in FIGS. 3B and 3C, the elastic metal portion 21 of the electrode tab 20 according to this embodiment projects toward the power generation element 10 (downward in FIGS. 3B and 3C) in the vicinity of the center thereof when no external force is exerted thereon.

Further, in the assembled condition shown in FIG. 3A, the outer covering material is sealed such that the internal air pressure thereof is lower than atmospheric pressure, for example substantially in a vacuum condition. In this condition, atmospheric pressure acts on the elastic metal portion 21 such that the entire surface of the elastic metal portion 21 comes into contact (surface contact) with the power generation element 10. Hence, the elastic metal portion 21 presses the power generation element 10 steadily more forcefully toward the center thereof.

To facilitate understanding of this embodiment, chemical reactions of the battery will now be described.

In a normal operating voltage range, a chemical reaction shown in a following Equation (1) occurs.

[Chemical Formula 1]

$$R^* + 1/2H_2 \rightarrow Alkyl\uparrow \quad (1)$$

Further, in an overcharge voltage region, reactions shown in following Equations (2-1) to (2-4) occur.

[Chemical Formula 2]

$$3CoO_2 \rightarrow Co_3O_4 + O_2\uparrow \quad (2\text{-}1)$$

$$ROCO_2R + 3O_2 \rightarrow 3CO_2\uparrow + 3H_2O \quad (2\text{-}2)$$

$$ROCO_2R + H_2O \rightarrow 2ROH + CO_2\uparrow \quad (2\text{-}3)$$

$$LiPF_6 + H_2O \rightarrow LiF + 2HF\uparrow + POF_3 \quad (2\text{-}4)$$

Furthermore, in an overdischarge voltage region, a reaction shown in a following Equation (3-1) or (3-2) occurs.

[Chemical Formula 3]

$$ROCO_2R + e^- + Li^+ + 1/2H_2 \rightarrow ROCO_2Li\downarrow + Alkyl\uparrow \quad (3\text{-}1)$$

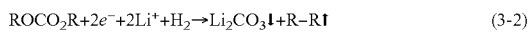
$$ROCO_2R + 2e^- + 2Li^+ + H_2 \rightarrow Li_2CO_3\downarrow + R\text{-}R\uparrow \quad (3\text{-}2)$$

Hence, gas is generated during a normal operation, during overcharging, and during overdischarging. The entire surface of the elastic metal portion 21 is in contact (surface contact) with the power generation element 10, and therefore, when no gas is retained in the electrolyte layer, a uniform current flows over all surfaces. When the gas generated in this manner is retained in the electrolyte layer, however, the current flow is impaired and the current on the periphery increases. As a result, regions having a high current density are formed locally. When the current density increases locally, lithium ions may be deposited by electrodeposition. As a result, local deterioration occurs. Further, the battery may fall into a vicious circle whereby the deterioration spreads to the periphery.

Furthermore, when charging and discharging are performed repeatedly, gas may be generated particularly in an initial stage due to film formation on the surface of the negative electrode, decomposition of the electrolyte solution, and so on. When the generated gas is retained in the electrolyte layer, the current flow is impaired. Moreover, the battery may fall into a vicious circle whereby further gas generation is induced due to unevenness in the electrolyte layer caused by the generated gas.

Therefore, as shown in FIGS. 3B and 3C, the elastic metal portion 21 of the electrode tab 20 according to this embodiment is formed to project toward the power generation element 10 (downward in FIGS. 3B and 3C) in the vicinity of the center thereof when no external force is exerted thereon. Accordingly, in the assembled condition shown in FIG. 3A, the power generation element 10 receives a steadily greater pressing force from the elastic metal portion 21 toward the center thereof. As a result, the gas generated in the electrolyte layer moves easily to the vicinity of the seal on the periphery, where the pressing force is smaller. Thus, the gas is prevented from impairing the current flow. No current flows in the vicinity of the seal originally, and therefore no problems occur when gas accumulates therein.

Figure 4A:
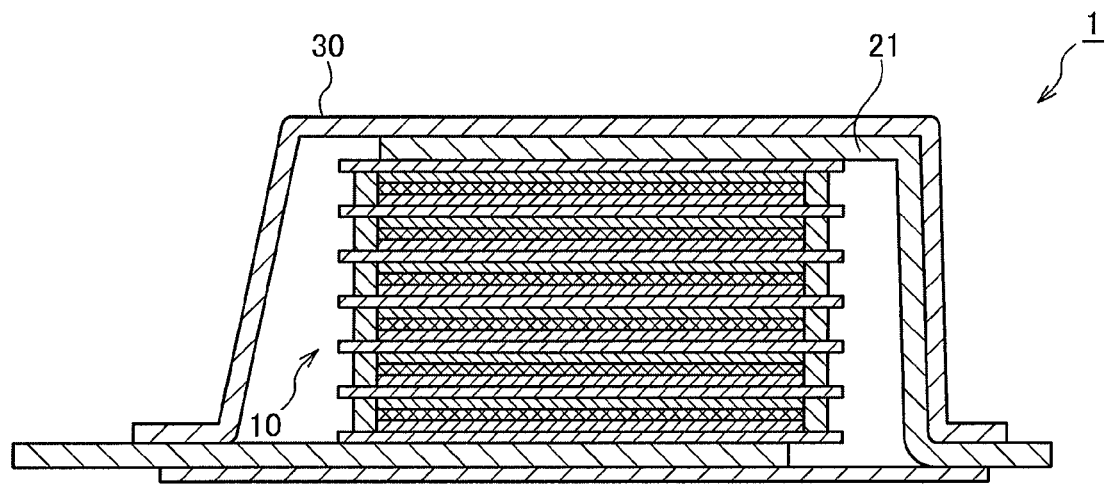
FIGS. 4A and 4B are views illustrating actions and effects of the second embodiment.
Figure 4B:
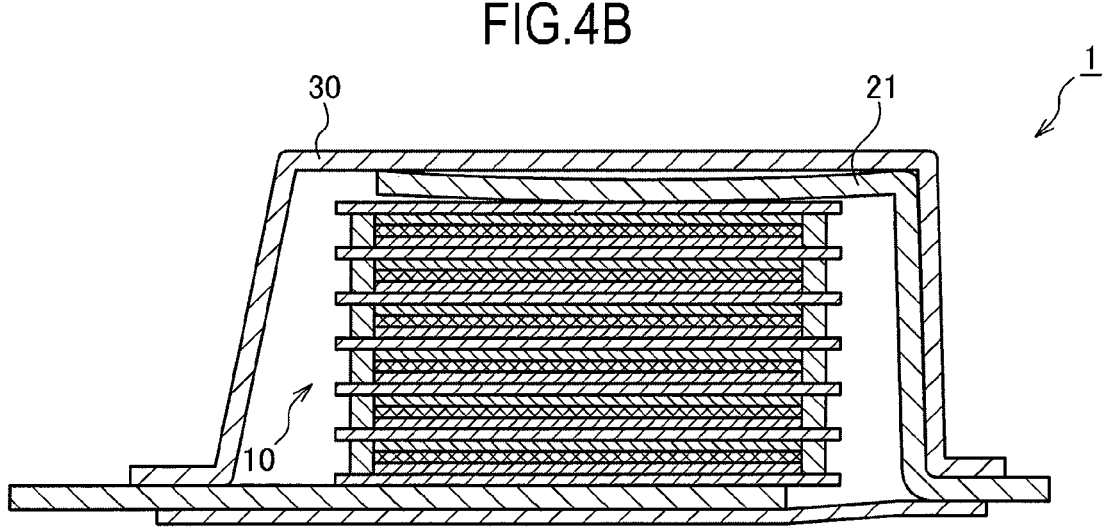

FIGS. 4A and 4B are views illustrating actions and effects of this embodiment, wherein FIG. 4A shows a normal condition and FIG. 4B shows an abnormal condition.

In the condition where the entire surface of the elastic metal portion 21 is in contact (surface contact) with the power generation element 10, the current flows uniformly over all surfaces. However, when a cause of an abnormality, such as an external short circuit, arises, the temperature of the power generation element 10 may increase excessively. When the temperature of the power generation element 10 increases, the electrolyte (electrolyte solution) gasifies, leading to an increase in the internal pressure of the outer covering material. In such a case, as shown in FIG. 4B, the elastic metal portion 21 deforms so as to separate from the power generation element 10 in regions other than a region near the center thereof such that the region near the center projects toward the power generation element. Accordingly, the current can only flow near the center, and therefore the current amount is limited. As a result, an excessive current is prevented from flowing.

Third Embodiment

Figure 5A:
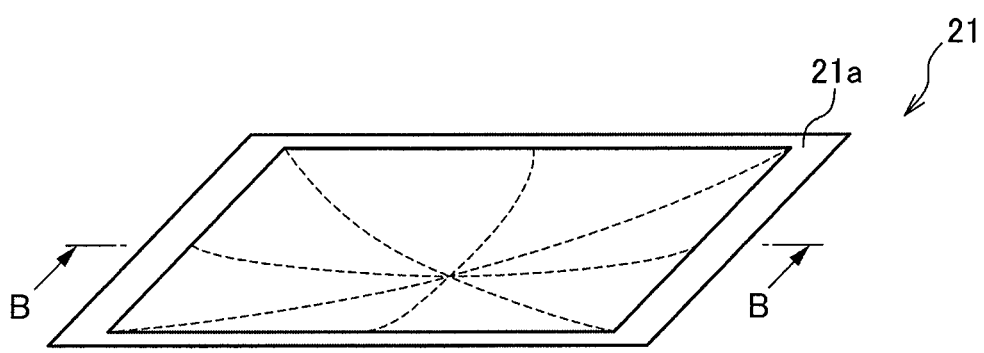
FIGS. 5A and 5B are views showing an elastic metal portion of an electrode tab in a third embodiment of the bipolar battery according to this invention.
Figure 5B:

FIGS. 5A and 5B are views showing an elastic metal portion of an electrode tab in a third embodiment of the bipolar battery according to this invention, wherein FIG. 5A is a perspective view of the elastic metal portion of the electrode tab and FIG. 5B is a B-B sectional view of FIG. 5A.

The elastic metal portion 21 of the electrode tab according to this embodiment is shaped such that the vicinity of the center thereof projects downward when no external force is exerted thereon, and such that a peripheral edge surface 21*a* is disposed on a single plane.

As described above, the outer covering material is sealed in a condition where the internal air pressure thereof is lower than atmospheric pressure. At this time, atmospheric pressure acts on the elastic metal portion 21 of the electrode tab via the outer covering material such that the elastic metal portion 21 of the electrode tab becomes flat. At this time, a peripheral edge of the elastic metal portion 21 may cut into the polymer film layer of the outer covering material or the like, thereby damaging the polymer film layer.

Hence, in this embodiment, the elastic metal portion 21 of the electrode tab is shaped such that when no external force is exerted thereon, the peripheral edge surface 21*a* is disposed on a single plane. With this structure, at least the peripheral edge surface 21*a* of the elastic metal portion 21 of the electrode tab contacts the outer covering material 30 at all times. Therefore, during manufacture of the bipolar battery according to this invention, the peripheral end of the elastic metal portion 21 can be prevented from damaging the polymer film layer of the outer covering material.

Fourth Embodiment

Figure 6A:
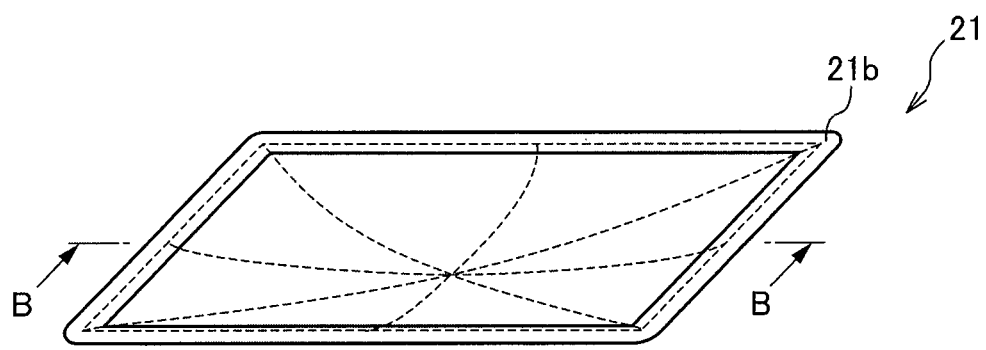
FIGS. 6A and 6B are views showing an elastic metal portion of an electrode tab in a fourth embodiment of the bipolar battery according to this invention.
Figure 6B:
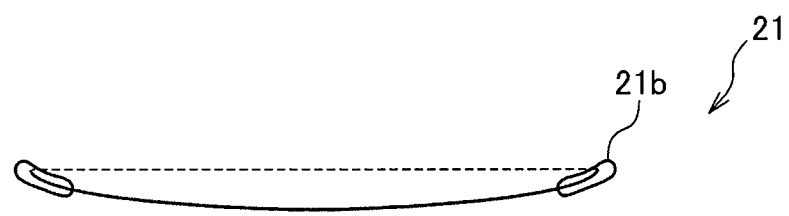

FIGS. 6A and 6B are views showing an elastic metal portion of an electrode tab in a fourth embodiment of the bipolar battery according to this invention, wherein FIG. 6A is a perspective view of the elastic metal portion of the electrode tab, and FIG. 6B is a B-B sectional view of FIG. 6A.

A site 21*b* coated with insulating resin is provided on a peripheral edge of the elastic metal portion 21 of the electrode tab according to this embodiment.

With this structure, at least the insulating resin-coated portion 21*b* of the elastic metal portion 21 of the electrode tab contacts the outer covering material 30 at all times. Therefore, during manufacture of the bipolar battery according to this invention, the peripheral end of the elastic metal portion 21 can be prevented from damaging the polymer film layer of the outer covering material. Further, even if the polymer film layer of the outer covering material is damaged, the insulating resin-coated portion 21*b* prevents a short circuit between the metal layer of the outer covering material and the elastic metal portion 21 of the electrode tab.

Fifth Embodiment

Figure 7A:
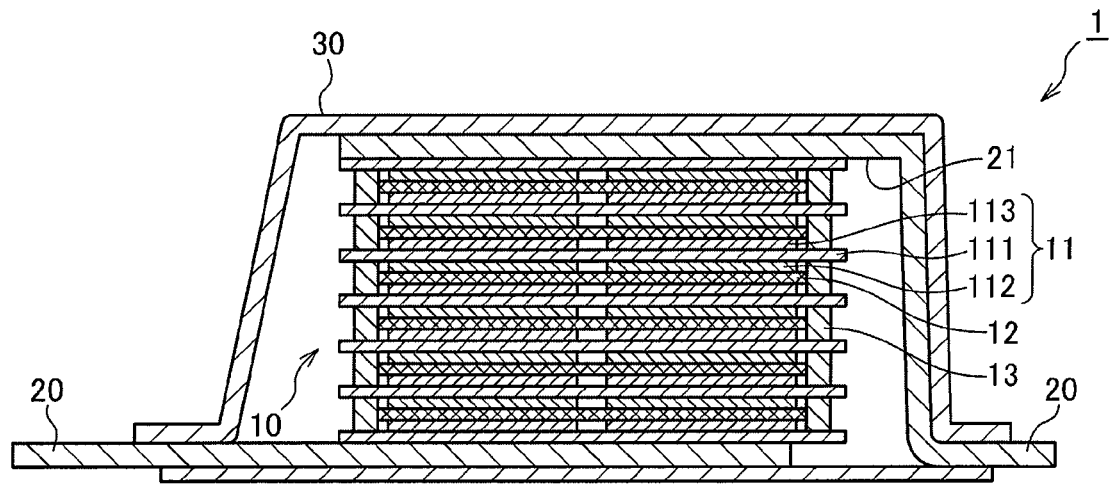
FIGS. 7A-7C are views showing a fifth embodiment of the bipolar battery according to this invention.
Figure 7B:
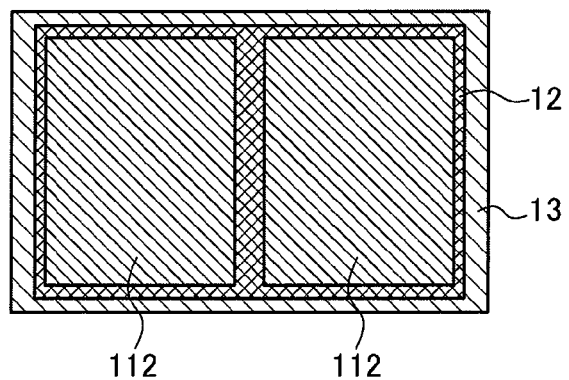
Figure 7C:
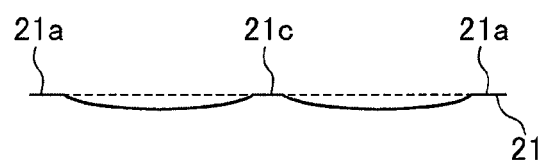

FIGS. 7A-7C are views showing a fifth embodiment of the bipolar battery according to this invention, wherein FIG. 7A is a longitudinal sectional view showing an assembled condition, FIG. 7B is a plan view showing a bipolar electrode and a seal on a periphery thereof, and FIG. 7C is a sectional view showing an elastic metal portion of en electrode tab in a condition where no external force is exerted thereon.

In the bipolar battery 1 according to this embodiment, a power generation region of the power generation element 10 is divided into a plurality of regions. More specifically, as shown in FIGS. 7A and 7B, the positive electrode 112 and the negative electrode 113 are divided into two such that the power generation region is formed in two locations.

As shown in FIG. 7C, the elastic metal portion 21 of the electrode tab is formed to project toward the vicinity of respective centers of the power generation regions of the power generation element 10 when no external force is exerted thereon. Further, the elastic metal portion 21 is shaped such that the peripheral edge surface 21*a* and a center surface 21*c* are disposed on a single plane.

In the assembled condition, as shown in FIG. 7A, the respective power generation regions of the power generation element 10 receives a steadily greater pressing force from the elastic metal portion 21 toward the center. In other words, the elastic metal portion 21 presses the power generation element 10 steadily more forcefully toward the respective centers of the power generation regions. Accordingly, the gas generated in the electrolyte layer moves easily to a peripheral region (a region in which the electrodes are not formed) where the pressing force is small. In this region, no current flows originally, and therefore the gas does not accumulate so as to cause problems.

This invention is not limited to the embodiments described above, and may be subjected to various amendments and modifications with the scope of the technical spirit thereof, wherein such amendments and modifications are, needless to mention, included in the technical scope of this invention.

Figure 8:
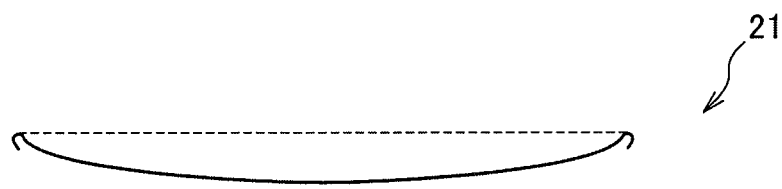
FIG. 8 is a view showing an elastic metal portion of an electrode tab in another embodiment of the bipolar battery according to this invention.

As shown in FIG. 8, for example, an end portion of the elastic metal portion 21 may be curled. Likewise in this case, the peripheral end of the elastic metal portion 21 can be prevented from damaging the polymer film layer of the outer covering material during manufacture of the bipolar battery.

Figure 9A:
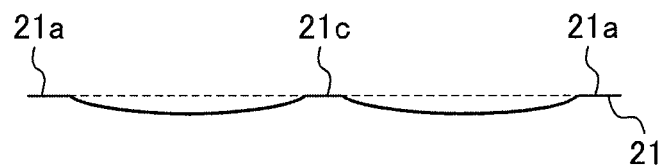
FIGS. 9A and 9B are views showing an elastic metal portion of an electrode tab in a further embodiment of the bipolar battery according to this invention.
Figure 9B:
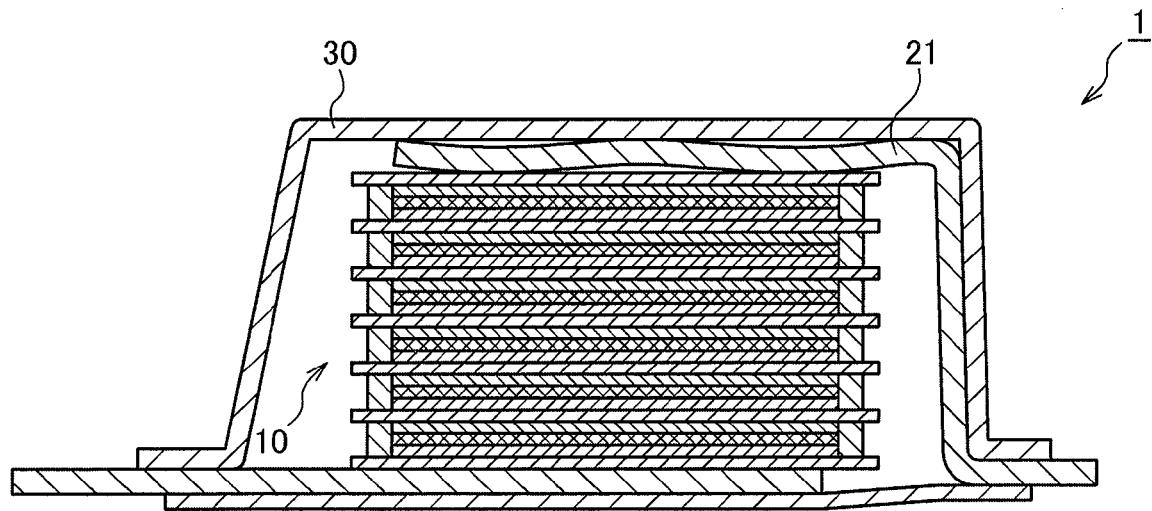

Further, in the fifth embodiment, the positive electrode 112 and the negative electrode 113 are divided into two such that the power generation region is formed in two locations. The elastic metal portion 21 of the electrode tab is then formed to project toward the vicinity of the respective centers of the power generation regions of the power generation element 10 when no external force is exerted thereon. As shown in FIGS. 9A and 9B, however, the power generation region may be formed in a single location while the elastic metal portion 21 of the electrode tab is formed to project in two locations. Likewise with this configuration, when a cause of an abnormality, such as an external short-circuit, arises, causing the temperature of the power generation element 10 to rise excessively such that the electrolyte (electrolyte solution) gasifies, the elastic metal portion 21 deforms as shown in FIG. 9B. As a result, the current only flows in the vicinity of the projecting shape, and therefore the current amount is limited such that an excessive current is prevented from flowing.

Furthermore, in the above embodiments, the elastic metal portion 21 is formed to project downward in point form near the center thereof when no external force is exerted thereon. However, the elastic metal portion 21 may be formed to project in line form.

Moreover, in the above embodiments, the elastic metal portion 21 is described as part of the electrode tab 20. By forming the elastic metal portion 21 integrally in this manner, an increase in a number of components is prevented, which is advantageous in terms of mass production. However, the electrode tab 20 may be provided as a separate component.

Further, the battery is not limited to a chargeable secondary battery, and may be a primary battery that cannot be charged.

Furthermore, the embodiments described above may be combined appropriately.

The present application claims priority to Japanese Patent Application No. 2010-166858 filed in Japan Patent Office on Jul. 26, 2010. The contents of this application are incorporated herein by reference in their entirety.

The invention claimed is:

1. A bipolar battery comprising:
 a power generation element formed by stacking a plurality of bipolar electrodes, in which an electrode layer is formed on a front and a rear of a collector, via an electrolyte layer;
 an elastic metal portion provided in contact with the power generation element so as to contact the power generation element in point or line contact when no external force is exerted thereon and contact the power generation element in surface contact when external force is exerted thereon; and
 an outer covering material provided to accommodate the power generation element and the elastic metal portion, an internal air pressure of which is set to be lower than an atmospheric pressure such that the elastic metal portion is caused to contact the power generation element in surface contact by a pressure difference between the internal air pressure and the atmospheric pressure.

2. The bipolar battery as defined in claim 1,
 wherein the elastic metal portion projects toward the power generation element when no external force is exerted thereon and contacts the power generation element in surface contact when external force is exerted thereon.

3. The bipolar battery as defined in claim 1,
 wherein the power generation element includes a power generation region divided into a plurality of regions, and
 the elastic metal portion projects toward the respective power generation regions of the power generation element when no external force is exerted thereon and contacts the power generation element in surface contact when external force is exerted thereon.

4. The bipolar battery as defined in claim 1,
 wherein the elastic metal portion is a part of an electrode tab for extracting power generated by the power generation element to an outer side of the outer covering material.

5. The bipolar battery as defined in claim 1,
 wherein the elastic metal portion is shaped such that when no external force is exerted thereon, a peripheral edge surface thereof is disposed on a single plane.

6. The bipolar battery as defined in claim 1,
 wherein a peripheral edge of the elastic metal portion is curled so as to separate from the outer covering material.

7. The bipolar battery as defined in claim 1,
 wherein the elastic metal portion further comprises an insulating resin-coated portion provided on the peripheral edge.

8. A bipolar battery comprising:
 a power generation element formed by stacking a plurality of bipolar electrodes, in which an electrode layer is formed on a front and a rear of a collector, via an electrolyte layer;
 an elastic metal portion provided to contact the power generation element so as to press against the power generation element steadily more forcefully toward a vicinity of a center of the power generation element; and
 an outer covering material provided to accommodate the power generation element and the elastic metal portion.

* * * * *